C. W. Moseley.
Destroying Grass.
N⁰ 96,464. Patented Nov. 2, 1869.

Witnesses:
Ju Knapp
Wm J Dodge

Inventor:
C. W. Moseley
per F. A. Moray &c.
Attys.

UNITED STATES PATENT OFFICE.

C. W. MOSELEY, OF ONONDAGA, NEW YORK.

IMPROVEMENT IN IMPLEMENTS FOR DESTROYING QUACK-GRASS.

Specification forming part of Letters Patent No. 96,464, dated November 2, 1869.

*To all whom it may concern:*

Be it known that I, CHARLES W. MOSELEY, of Onondaga, in the county of Onondaga and State of New York, have invented a new and Improved Implement for Destroying Quack-Grass; and I do hereby declare that the following is a full, clear, and exact description thereof, which will enable those skilled in the art to make and use the same, reference being had to the accompanying drawings, forming part of this specification, in which—

Figure 1:
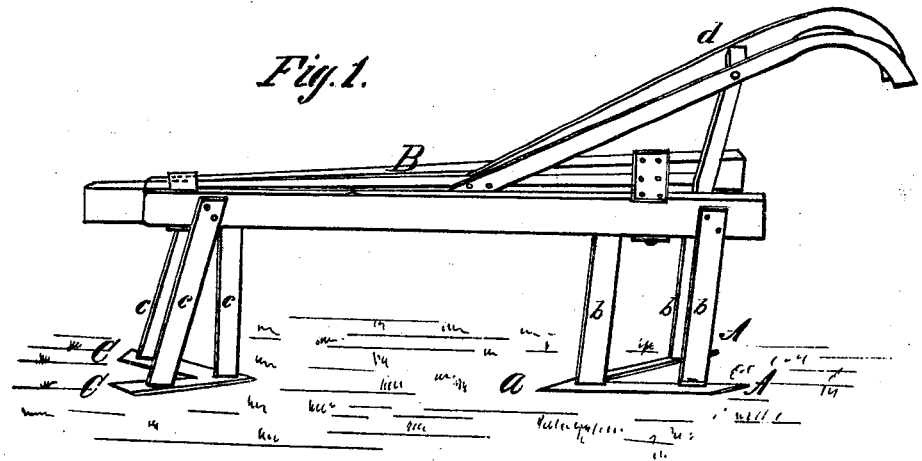
Figure 2:
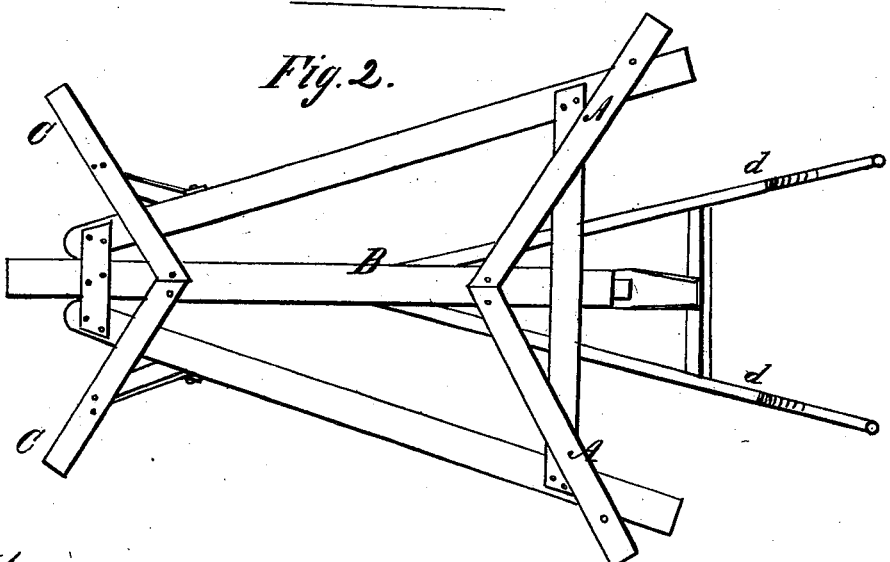

Figure 1 is a side view of my improvement, and Fig. 2 is a bottom view of the same.

Similar letters of reference indicate like parts.

The useful effect of this implement is based upon the fact that vegetation of any kind can live but a short time below the surface of the ground when its breathing parts above ground have been removed or destroyed, and for destroying quack-grass I provide an implement with thin steel blades, which are drawn horizontally in the ground one or two inches below the surface, thereby cutting or shaving off the breathing parts of the grass, and in that manner destroy it without disturbing the roots, as hereinafter more fully described.

In the accompanying drawings, A A is a thin knife, made of spring-steel, and attached horizontally to a suitable frame, B $d$, by thin standards $b$, Fig. 1, said knife or blade having a sharp front edge, and in general form being A-shaped, having a nose or apex, $a$. On the forward part of the frame-work I attach a second A-shaped knife, C, by means of thin standards $c\ c\ c$, which is similar to knife A in all respects, only the apex of the knife C is placed to the rear. This knife can be made with its apex or point toward the front; but in the position shown the implement runs steadier laterally. The front knife, C, is designed more particularly to prepare the way for the rear knife by crowding any stone it may meet with out onto the surface of the ground. The front knife also acts as a rest for the front part of the frame-work; but the said knife can be dispensed with when the implement is to be used in ground that is free from stone.

This implement has been tried and works well, by the third or fourth cutting entirely destroying said grass, which is so difficult to eradicate usually.

Having thus described my invention, what I claim as new, and desire to secure by Letters Patent, is—

The steel cutter A and C, in connection with a frame, B $d$, substantially as herein set forth, and for the purpose specified.

The above specification of my invention signed by me this 21st day of August, 1869.

C. W. MOSELEY.

Witnesses:
    WM. J. DODGE,
    F. A. MORLEY.